United States Patent
Kuppers et al.

(10) Patent No.: US 6,691,388 B1
(45) Date of Patent: Feb. 17, 2004

(54) STRIP FITTING TOOLS

(75) Inventors: Jürgen Kuppers, Bruggen (DE); Klaus Krawczyk, Viersen (DE); Ewald Strehl, Monchengladbach (DE); Markus Reuvers, Kempen (DE)

(73) Assignee: GenCorp Property, Inc., Ranchero Cordova, CA (US)

( * ) Notice: Subject to any disclaimer, the term of this patent is extended or adjusted under 35 U.S.C. 154(b) by 0 days.

(21) Appl. No.: 09/787,827

(22) PCT Filed: Jul. 23, 1999

(86) PCT No.: PCT/GB99/02411

§ 371 (c)(1),
(2), (4) Date: Jun. 14, 2001

(87) PCT Pub. No.: WO00/18601

PCT Pub. Date: Apr. 6, 2000

(30) Foreign Application Priority Data

Sep. 25, 1998 (GB) ............................................... 9820965

(51) Int. Cl.⁷ ............................. B23P 11/00; B23P 19/02
(52) U.S. Cl. ............................. 29/243.5; 29/235; 29/509
(58) Field of Search ........................... 29/509, 505, 514, 29/450, 235, 243.5, 243.522, 243.56, 243.57, 243.58; 72/210, 211

(56) References Cited

U.S. PATENT DOCUMENTS 4,172,313 A  10/1979  Takahashi
4,242,559 A  * 12/1980  Roemer et al. .......... 219/69 W

FOREIGN PATENT DOCUMENTS

| EP | 0 431 827 A2 | 11/1990 |
| EP | 0 818 276 A2 | 1/1998 |
| EP | 0 818 277 A2 | 1/1998 |
| EP | 0 818 278 A2 | 1/1998 |
| EP | 0 822 019 A1 | 2/1998 |
| GB | 2 215 762 A | 9/1989 |
| GB | 2 299 829 A | 10/1996 |
| GB | 2 315 313 A | 1/1998 |

* cited by examiner

*Primary Examiner*—John C. Hong
(74) *Attorney, Agent, or Firm*—Leydig, Voit & Mayer, Ltd.

(57) ABSTRACT

A portable tool for fitting a channel-shaped sealing, trimming or guiding strip onto a mounting flange comprises a gear box having an input shaft rotated by suitable motor and which drives two rollers in contra-rotating directions about respective axes. When the motor is energized to contra-rotate the rollers, the tool is driven along the strip and the rollers force the sides of the channel of the strip into tight frictional contact with the flange. The axis of one of the rollers is fixed in relation to the tool body. The other roller is mounted on a sub-frame so that its axis can pivot about a pivot axis which intersects with the rotation axis of that roller. The tool also includes a third roller for engaging the outside of the inverted base of the channel.

12 Claims, 8 Drawing Sheets

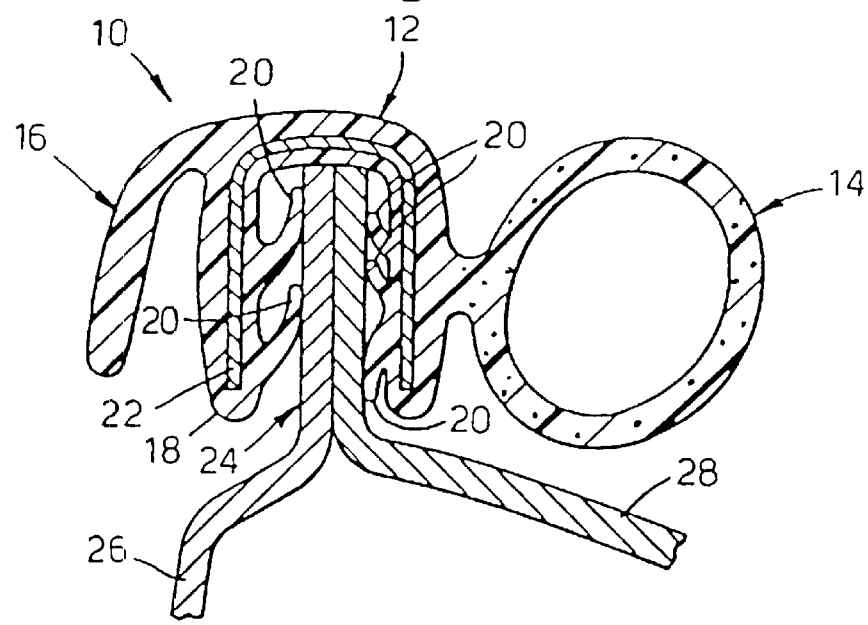
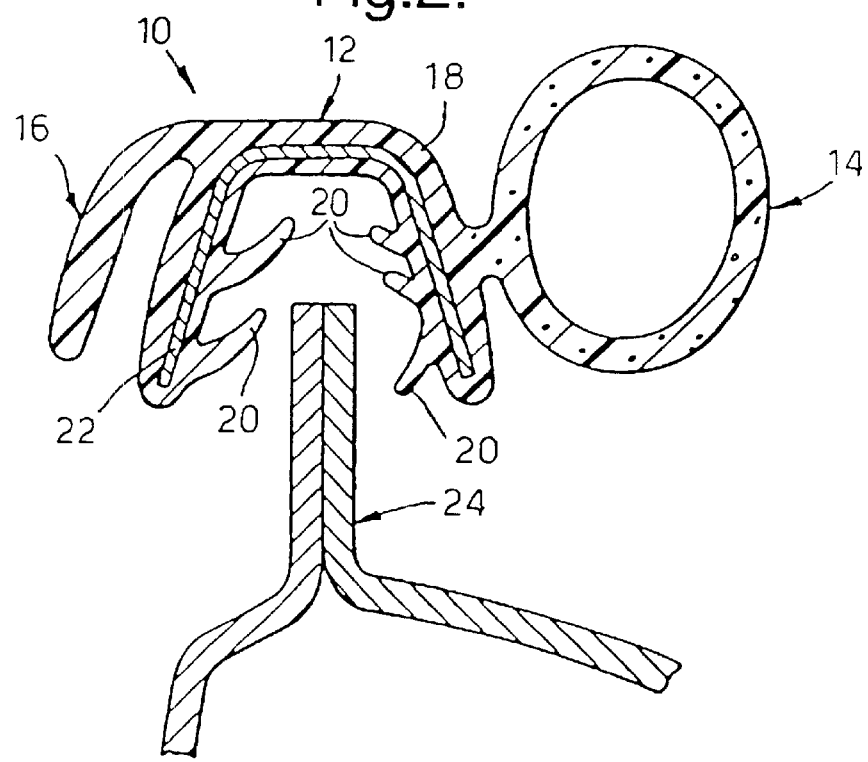

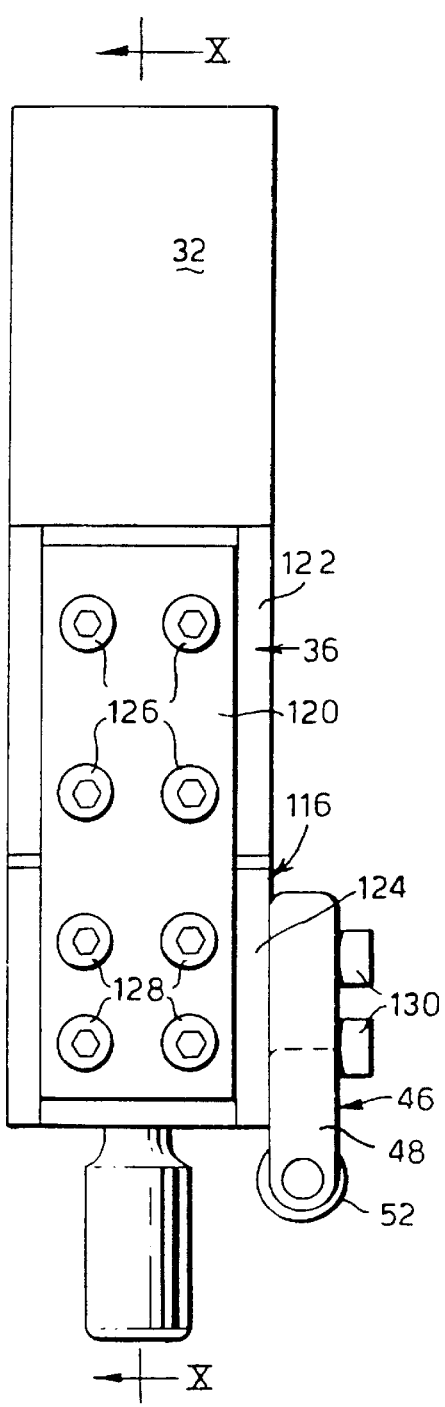
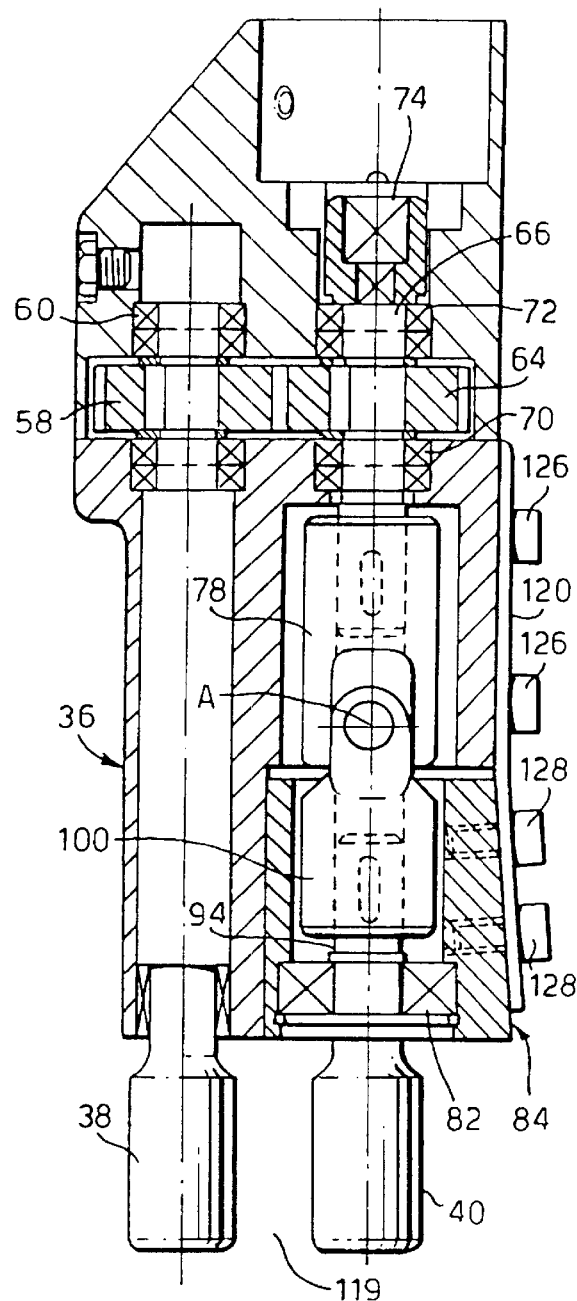

STRIP FITTING TOOLS

The invention relates to a tool for fitting a channel-shaped strip into an embracing frictional position on a mount, comprising a tool body, first and second main rollers mounted side-by-side on the body for rotation about respective first and second axes and for receiving the strip in the gap between them and for exerting a force tending to press the side walls of the channel of the strip towards the mount as the rollers rotate and the tool travels along the strip on the mount, the first and second rollers being relatively movable away from and towards each other and the first axis being fixed in relation to the body.

The invention also relates to a method of fitting a channel-shaped strip into a frictionally embracing position on a longitudinally extending mount which has first and second oppositely directed longitudinal faces the first of which is substantially smooth and planar and the second of which has local disruptions which change the thickness of the mount, comprising the steps of fitting the channel of the strip embracingly over the flange, applying sideways-directed forces to the outsides of the side walls of the channel by means of first and second side-by-side rollers carried by a tool body and which contra-rotate about respective first and second axes and through the gap between which the strip passes in contact with the rollers, the first axis being fixed in relation to the tool body and the first roller applying its force to the outside of the side wall of the channel on the first face of the mount.

Such a tool and such a method are shown in GB-A-2 215 762. In the tool there shown, the second roller can be moved towards and away from the first roller by a mechanism which maintains the axes of the two rollers parallel to each other. This requires a relatively complex mechanism, the movement of the second roller away from the first roller being carried out by means of a manually rotated screw or similar arrangement. However, it may be desirable to arrange for the second roller to move away from the first roller automatically, such as in response to variation in thickness of the mount.

Accordingly, the tool as first set forth above is characterised in that the second axis is angularly pivotal, with the second roller, relative to the body about a predetermined pivot axis.

According to the invention, also, the method as first set forth above is characterised in that the second roller is pivotal against a spring bias through a predetermined angular distance relative to the first roller about a predetermined pivot axis whereby to accommodate local variations in thickness along the length of the mount as the tool travels along the strip on the mount while the rollers contra-rotate.

Tools and methods according to the invention, and for use in fitting sealing, trimming or finishing strips to motor vehicle bodies, will now be described, by way of example only, with reference to the accompanying diagrammatic drawings in which:

FIG. 1 is a cross-section through a sealing, trimming or finishing strip showing it fitted onto a motor vehicle body, such as around the frame of a door opening;

FIG. 2 shows the strip of FIG. 1 during an initial stage of the fitting process;

FIG. 9 is a view corresponding to FIG. 4 but showing another of the tools; and FIG. 10 is a cross-section on the line X—X of FIG. 9.

Figure 3:
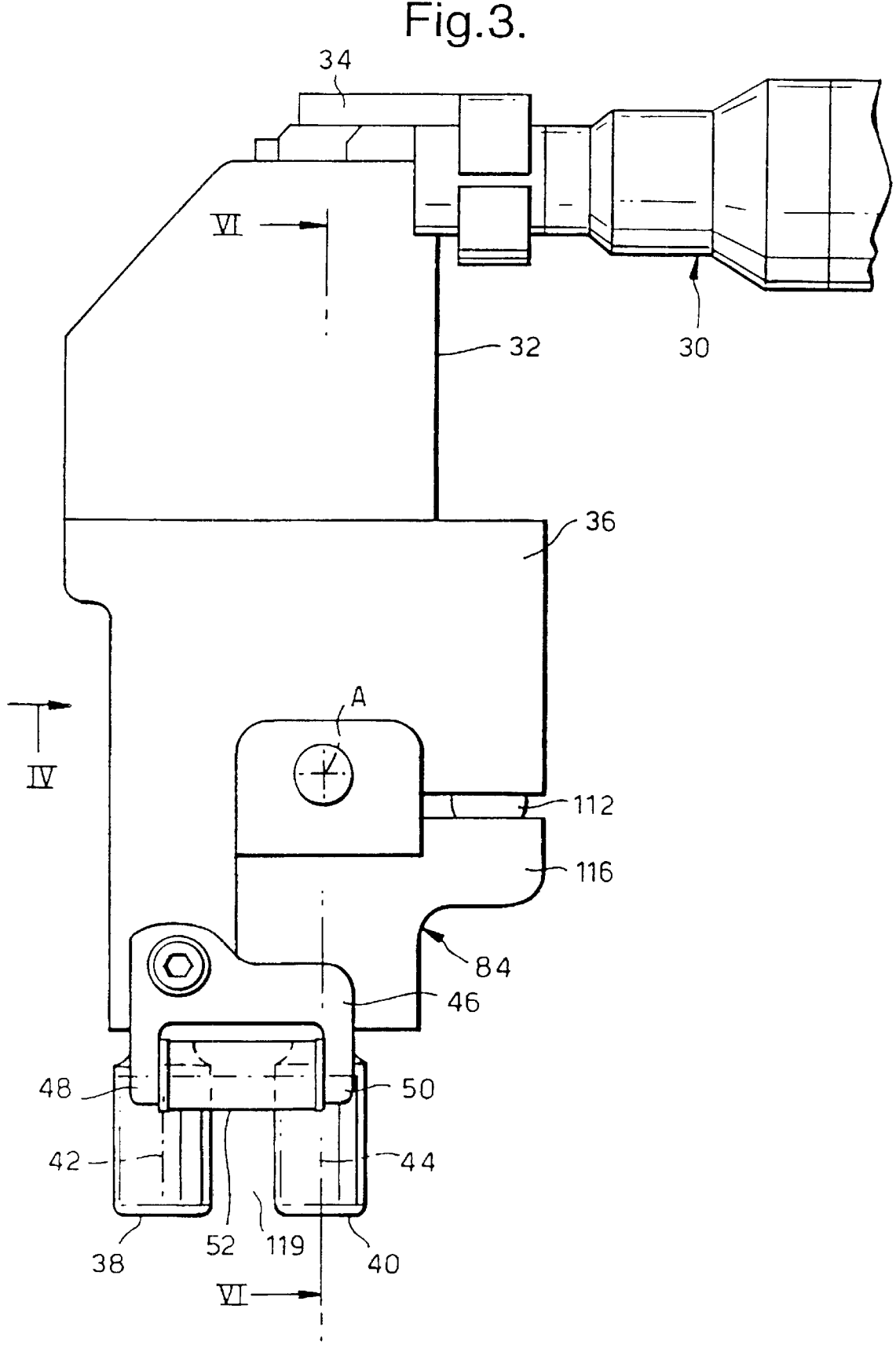
FIG. 3 is a side elevation of one of the tools, for use in fitting the seal of FIGS. 1 and 2 in position.

As shown in FIG. 1, a sealing, trimming or finishing strip 10 comprises a gripping part 12, a sealing part 14 and a so-called "cosmetic lip" 16. The gripping part 12 is channel-shaped and is advantageously extruded from plastics or rubber or similar material 18. The extruded material 18 has integral inwardly directed gripping lips 20, there being in this example two relatively large lips on one inside wall of the channel and three smaller lips on the opposite side; however, the number and sizes of the lips can be varied. In addition, the gripping part 12 incorporates a channel-shaped reinforcing carrier 22, advantageously made of metal or other resilient material. The carrier may comprise a plurality of U-shaped elements arranged side-by-side to define the channel and connected together by short integral connecting links or entirely disconnected from each other. Instead, wire looped to and fro may be used to form the carrier. Other forms of carrier are possible. Advantageously, the carrier 22 is incorporated into the extruded material 18 using a cross-head extruder.

The gripping part 12 embracingly grips a mounting flange 24, such as forming the frame of a door opening in the motor vehicle body. The flange 24 may be formed where inner and outer body panels 26 and 28 are brought together at the door opening and welded to each other. The gripping part 12 tightly grips the flange 24, the lips 20 frictionally contacting the opposite faces of the flange. For this purpose, the material of the lips is advantageously softer than the remainder of the extruded material of the gripping part to provide an increased coefficient of friction.

The sealing part 14 is mounted on one outside wall of the channel of the gripping part 12 and, in this example, is of hollow tubular form. It is advantageously extruded from plastics or rubber or similar material but is softer than the extruded material 18 of the gripping part 12. For example, the sealing part 14 may be extruded from cellular material. It may be co-extruded with the material 18 or formed separately and adhesively or otherwise secured to the gripping part 12. When the gripping part 12 is mounted on the flange 24 in the manner shown, the sealing part 14 runs around the frame of the door opening facing outwardly of the vehicle so as to be partially compressed by the closing door thus forming a weatherproof seal.

The cosmetic lip 16 is advantageously co-extruded with the material 18. When the gripping part 12 is mounted in position on the flange 24, the cosmetic lip is positioned on the inside of the vehicle, running around the frame of the opening, and is used to cover, and partially secure, the edge of the vehicle trim on the inside of the vehicle and adjacent to the door opening.

FIG. 2 shows the manner in which the sealing strip 10 is mounted on the flange 24. As shown, the gripping part 12 is supplied to the vehicle manufacturer with the side walls of the channel splayed outwardly relative to each other. In this way, the fitter on the assembly line can easily position the gripping part on the flange 24 because the channel mouth is much wider than the width of the flange. Thereafter, using the tool to be described in more detail below, the splayed-apart side walls of the gripping part are pressed towards each other so as to force them, and the lips 20, into tight frictional gripping contact with the flangesxand thus into the configuration shown in FIG. 1.

Figure 4:
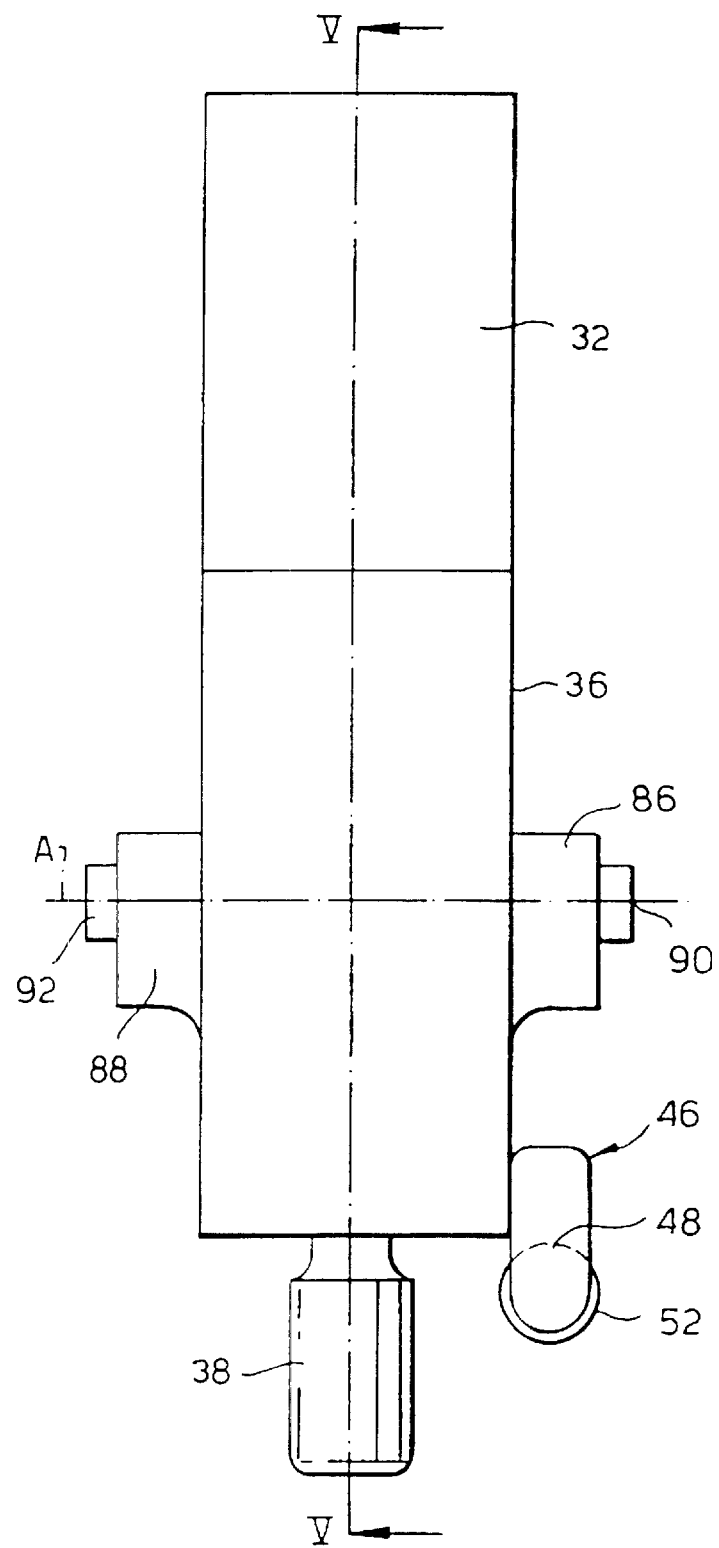
FIG. 4 is a front elevation of the lower part of the tool of FIG. 3, taken in the direction of the arrow IV of FIG. 3.

Referring to FIGS. 3 and 4, the tool shown there comprises a motor 30 such as an air motor driven by compressed air. The motor 30 is connected to a gearbox 32 by a mounting bracket 34. The gearbox 32 supports a main tool body or output unit 36 from which rotatably extend two main rollers 38 and 40. The rollers 38 and 40 are arranged to be rotatable around respective axes shown dotted at 42 and 44. Via the gearbox 32, the output shaft (not shown) of the air motor 30 drives the rollers 38 and 40 to rotate in opposite directions about these axes.

The output unit 36 also carries a roller support 46 which has two oppositely facing jaws 48 and 50 between which is rotatably mounted a third or "top" roller 52 which is undriven.

FIGS. 4 to 8 omit the bracket 34 and the air motor 30.

Figure 5:
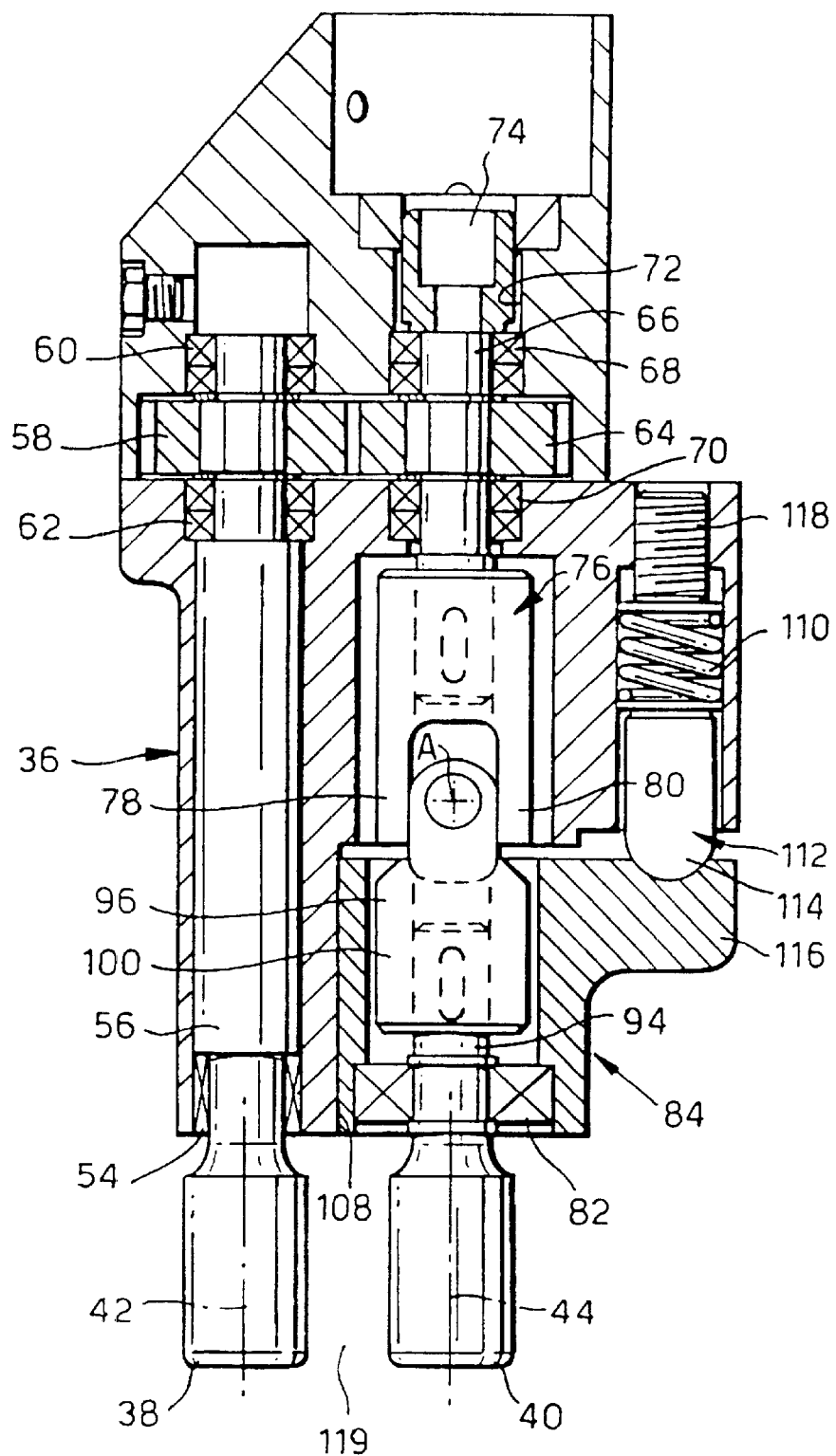
FIG. 5 is a cross-section on the line V—V of FIG. 4.

FIG. 5 shows the internal mechanism of the tool in more detail. As shown, roller 38 is rotatably mounted in a bearing 54 and rigid with a shaft 56. The upper end of shaft 56 is fixed to a gear 58 and supported in upper and lower bearings 60, 62. Gear 58 meshes with another gear 64 carried by a shaft 66 which is rotatably supported in upper and lower bearings 68, 70. Shaft 66 upwardly terminates in an end part 72 having an open bore 74 of rectangular cross-section. The bore 74 receives a correspondingly shaped male part at the end of the output shaft (not shown) from the air motor 30.

The lower end of the shaft 66 terminates in a yoke 76 having integral jaws 78 and 80.

Figure 6:
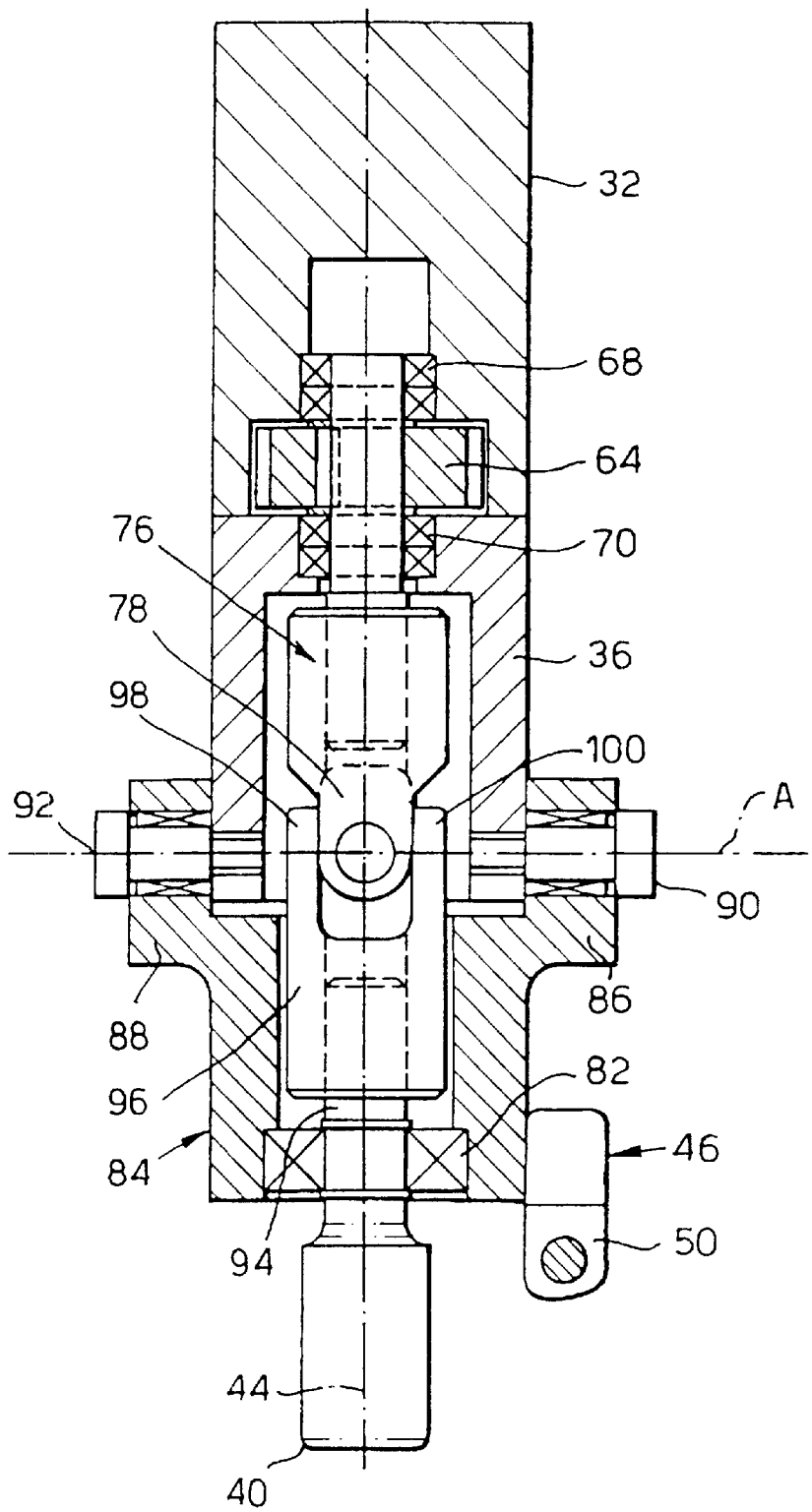
FIG. 6 is a cross-section on the line VI—VI of FIG. 3.

Roller 40 is rotatably supported in a bearing 82. Bearing 82 is carried in the end of a sub-frame 84. As best shown in FIG. 6, the sub-frame 84 has integral arms 86 and 88 which extend respectively onto the front and rear faces of the output unit 36 and are pivotally connected thereto by respective pivot pins 90 and 92 forming a pivot axis A. Roller 40 is integral with a shaft 94 which is rigid with a yoke 96 (see FIGS. 5 and 6) having jaws 98 and 100. The pair of jaws 78 and 80 of the yoke 76 carried by the shaft 66 (FIG. 5) are linked to the jaws 98, 100 carried by the yoke 96 of the shaft 94 (FIG. 6) by a spider (not shown) to form a universal joint.

As shown in FIG. 5, the sub-frame 84 is located within a right-angled recess in the lower part of the output unit 36. This recess has a surface 108, against which the sub-frame 84 is pivotally urged around pivot axis A (see FIG. 4 and 6) by a compression spring 110 engaging a pin 112. Pin 112 has its distal end 114 located in a correspondingly shaped recess in an outwardly extending arm 116 of the sub-frame. An adjustment screw 118 enables the force exerted by the spring 110 to be adjusted. As shown in FIG. 5, the axes 42 and 44 of the rollers 38 and 40 are parallel when the sub-frame 84 is in contact with the face 108. It is not, however, essential that the axes 42 and 44 are parallel when the sub-frame 84 is in contact with the face 108.

Figure 7:
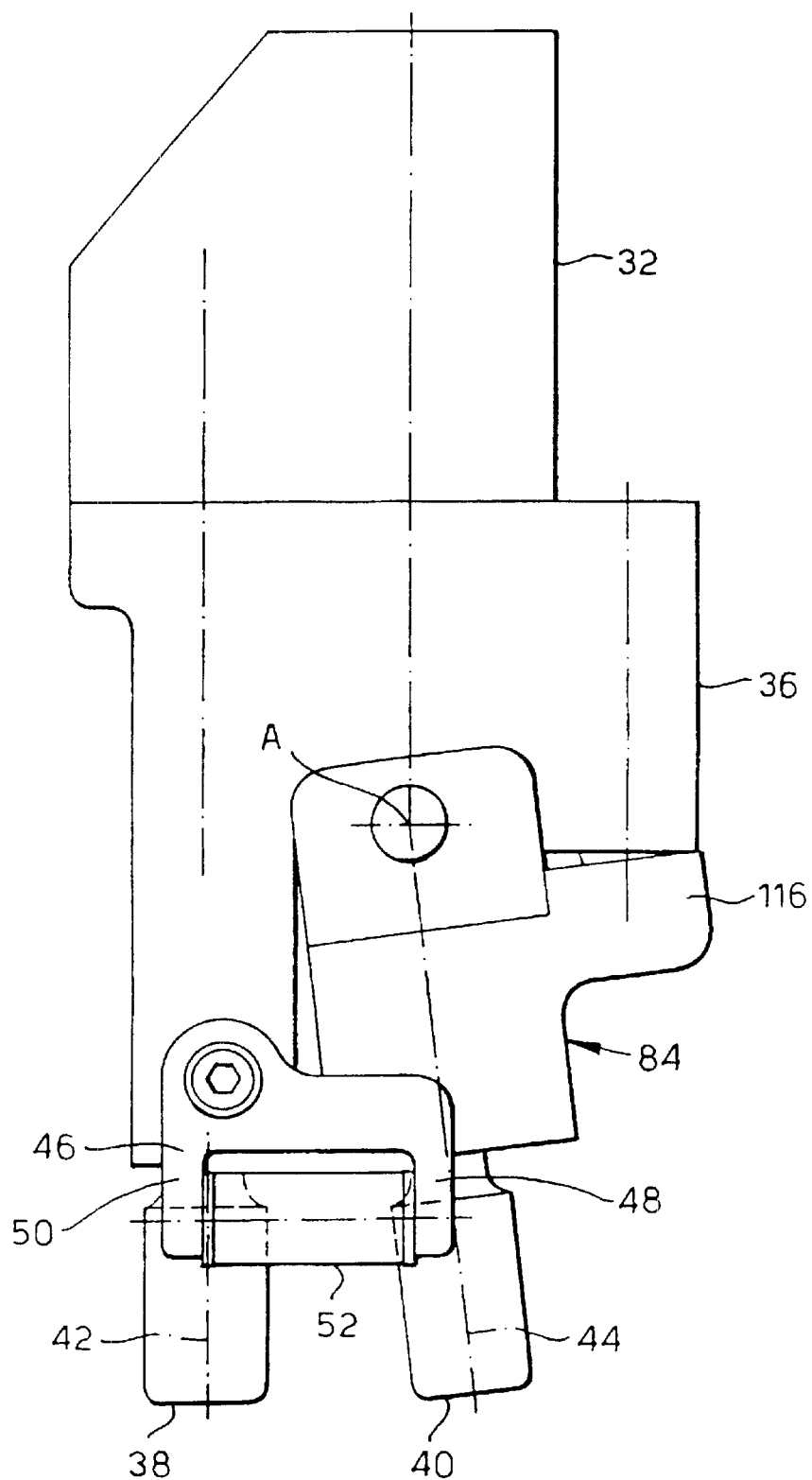
FIG. 7 is a view corresponding to FIG. 3 but showing the tool in use.

In use, the strip 10, in the configuration shown in FIG. 2 is placed over the mounting flange 24. The tool is then placed over the strip 10 on the flange so that the gripping part 12 (with its splayed-apart side walls), the sealing part 14 and the cosmetic lip 16, all become positioned in the space 119 between the side rollers 38 and 40 (see FIGS. 3 and 5); it will be appreciated that the strip 10 shown in FIGS. 1 and 2 is illustrated to a much larger scale than the scale of the tool. The tool is positioned over the strip 10 so that roller 38 is in contact with the outside of the cosmetic lip 16 and roller 40 is in contact with the outermost surface of the sealing part 14. During this initial positioning step, the force exerted on the two rollers 38 and 40 by the compressed material of the strip 10 as it becomes forced into the gap 118 may cause the sub-frame 84 to pivot on the pivot axis A against the force of the spring 110. The roller 40 thus becomes slightly inclined to the roller 38 as shown in FIG. 7. However, any such pivotting movement will be small because the spring 110 is arranged to exert a strong force.

Typically, during initial positioning of the tool, the air motor 30 is already energised. Roller 40 is therefore rotated via the upper shaft 66 and the universal joint provided by the interconnected yokes 76 and 96. Corresponding rotation of the gear 64 causes roller 38 to be driven in the opposite direction. Thus, the rollers 40 and 38 are already rotating before coming into contact with the strip 10. Once the rollers are in contact with the strip, the tool is carried along the strip 10 on the flange 24, with the top roller 52 freely rotating on the outside of the inverted base of the gripping part 12 of the strip 10, the tool being guided during its travel by the fitter. The tool may instead be guided by a robot "hand".

As the tool moves in this way along the strip on the flange, the rollers 38, 40 have the effect of forcing the splayed-apart side walls of the gripping part 12 towards the flange 24 so that the lips 20 make tight frictional contact with the flange. During this process, the gripping part 12 is similarly re-configured and ensures that, as the tool passes each particular point along the length of the strip 10, the gripping part 12 maintains its new configuration which corresponds to that shown in FIG. 1 and in which the strip is held securely on the flange.

Although FIGS. 1 and 2 show the flange 24 as comprising two contacting body panels 26 and 28, there may be positions along the frame of the door opening where, locally, the flange comprises more than two contacting panels. This will therefore cause a local variation in thickness of the flange 24. There may be other reasons why the thickness of the flange 24 varies locally along the periphery of the door opening: there may be a local variation in the thickness of one or more of the body panels for example, and the welding points may also cause thickness variations. However, the tool is able to accommodate such variations in flange thickness because the roller 40 can pivot away from the roller 38, as shown in FIG. 7, when the within the gap 119 becomes increased by a local increase in thickness of the flange 24 and overcomes the force exerted by the spring 110. The ability of the roller 40 to pivot in this way ensures that any local increase in flange thickness does not cause an excessively damaging force to be exerted by the rollers on the strip 10 both at the beginning and during the tool's travel along the strip 10.

An important feature of the tool is that the axis 42 of the roller 38 is fixed relative to the tool: in other words, the axis of only one of the rollers (roller 40) can pivot with respect to the main body of the tool. Normally, the inside face of the flange 24 (that is, the face on the inside of the vehicle and corresponding to the side of the channel of the gripping portion 12 from which extends the cosmetic lip 16) is smooth. The local variations in thickness normally occur on the outer face of the flange 24. Therefore, the tool is positioned in use so that the roller 38, with its fixed axis 42, engages the part of the strip 10 on the inside (smooth) face of the flange 24—that is, roller 38 engages the cosmetic lip 16. The tool is therefore driven around the flange so that the body of the tool, except for the pivotted sub-frame 84, maintains a fixed position in relation to the plane of the inside face of the flange 24. In the manner explained, the local variations in flange thickness are accommodated by pivotting movement of the sub-frame 84 and consequent angular movement of the axis of the roller 40 with respect to the axis of the roller 38. Such an arrangement is found to ensure that a substantially constant sideways clamping force is applied to the sealing strip 10 around the periphery of the door opening in spite of local variations of flange thickness. It is also found to give better results than would be obtained with an arrangement in which the axes of both of the rollers 38 and 40 can pivot relative to the main body of the tool. In such an arrangement, positive location of the main body of the tool with reference to the flange 24 cannot be ensured.

It will be appreciated that if, for example, the outer face of the flange 24 were smooth and the inner face had local variations in thickness, the tool would be arranged instead to have the fixed axis roller engage the part of the strip 10 on the outside face of the flange 24.

Another significant feature of the tool is that the pivot axis A of the sub-frame 84 intersects the axis 44. This ensures that translational movement of roller 40 in the directions X (see FIG. 5)—that is, along the length of the axis 44—when the sub-frame 84 pivots is minimised.

Figure 8:
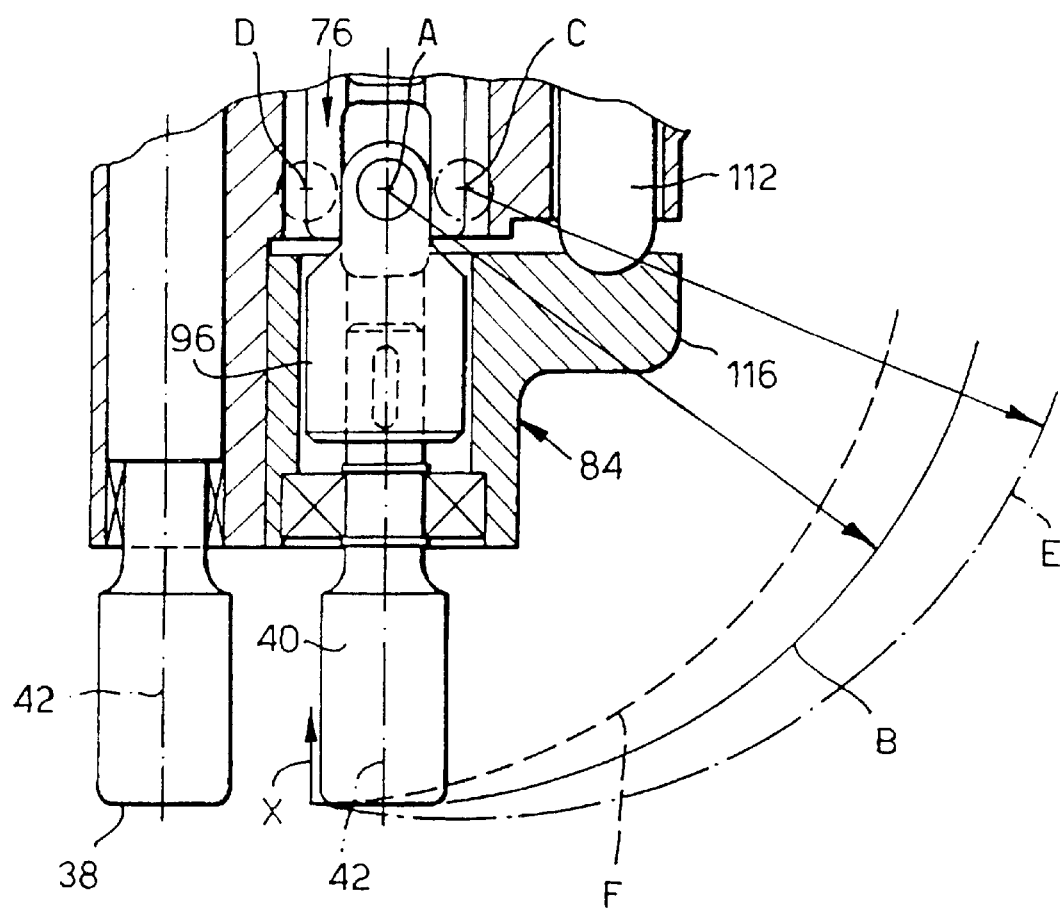
FIG. 8 is a partial view corresponding to FIG. 5 but modified to explain a feature of the tool.

This is better illustrated in FIG. 8. In FIG. 8, the curved line B shows the position of the distal end of the roller 40 as the sub-frame 84 pivots about the axis A.

FIG. 8 also illustrates two alternative positions C and D for the pivot axis of the sub-frame 84. Curved dotted line E shows the position which would be assumed by the distal end of the roller 40 as the sub-frame 84 pivots about the axis C, while the curved dotted line F shows the position which would be assumed by the distal end of the roller 40 if the sub-frame 84 pivotted about the axis D. The dotted lines E and F in each case show how the distal end of the roller 40 (and thus, of course, the remainder of the roller as well) would move by a greater distance in the directions X if the pivot axis of the sub-frame 84 were to be positioned at C or D than when it is located at A.

It will be appreciated that many alterations can be made to the mechanism for pivotally mounting the tool 40.

One such modification is shown in FIGS. 9 and 10 in which parts corresponding to those in the other Figures are similarly referenced. In the tool of FIGS. 9 and 10, the coil spring 110 of the tool of FIGS. 3–8 is replaced by a leaf spring 120. As shown most clearly in FIG. 10, the body 36 is modified to remove the pin 112, the coil spring 110 and the adjustment screw 118, and the bores in which they are housed, so as, instead, to provide a flat external surface 122 for the body 36. The sub-frame 84 is also modified so that it, too, has a generally flat external surface 124. The leaf spring 120 is attached by bolts 126, 126 to the surface 122 and by bolts 128, 128 to the surface 124 so as to extend between them. As shown in FIG. 10, the surface 124 is slightly inclined with respect to the surface 122 so that, when the roller 40 is parallel to the roller 38, the leaf spring 120 is slightly bent. This provides pre-stressing for the leaf spring 120, enabling its spring constant to be relatively low. When the roller 40 is pivotted about the pivot axis A, the surface 124 of the sub-frame 84 becomes more inclined to the surface 122 so that this pivotting action is resiliently resisted by the leaf spring. Other modifications are shown in FIGS. 9 and 10. For example, the pivotal mounting of sub-frame 84 is simplified, because it is supported by the leaf spring 120 and resiliently connected by that spring to the body 36. Roller support 46 is mounted in position by bolts 130.

It will be appreciated that the tools illustrated may be used for fitting strips in which the sealing part 14 is mounted on the outside of the inverted base of the gripping part 12 instead of on one outside side wall. In such a case, the top roller 52 will make contact with the sealing part. The tool shown may also be used to fit strips in which there is no sealing part 14 but only the cosmetic lip 16 or in which there is only the sealing part 14 or in which there is neither sealing part nor cosmetic lip.

The rollers 38 and 40 can be arranged to be removable to enable them to be replaced by rollers of different shape or size to suit differently shaped or sized strips 10.

What is claimed is:

1. A tool for fitting a channel-shaped strip having a base and side walls forming a channel into an embracing frictional position on a mount, said tool comprising:

a tool body;

first and second main rollers mounted side-by-side on the body for rotation about respective first and second axes;

spring-biassing means for biassing the second roller into a datum position in which the second axis is substantially parallel to the first axis;

a gap formed between the first and second main rollers, the strip being received in the gap and the spring-biassing means causing the first and second rollers to exert a force tending to press the side walls of the channel of the strip towards the mount as the rollers rotate and the tool travels along the strip on the mount, the first and second rollers being relatively movable away from and towards each other and the first axis being fixed in relation to the body, the second axis and the second roller being angularly pivotal relative to the body about a predetermined pivot axis; and a drive mechanism for driving the first and second main rollers;

wherein the spring-biassing means is spaced apart from the first and second main rollers and the driving mechanism therefor.

2. A tool according to claim 1 wherein the pivot axis intersects the second axis.

3. A tool according to claim 1 wherein the spring-biassing means comprises a coil spring.

4. A tool according to claim 1 wherein the spring-biassing means comprises a leaf spring.

5. A tool according to claim 1 wherein the second roller is mounted on a sub-frame which is pivoted to the tool body about the pivot axis.

6. A tool according to claim 1 wherein the second roller is mounted on a sub-frame which is pivoted to the tool body about the pivot axis, and wherein the tool further comprises a spring-biassed member movably mounted on the tool body and contacting part of the sub-frame for biassing the second roller into the datum position.

7. A tool according to claim 6 wherein the spring-biassed member is biassed by a coil spring.

8. A tool according to claim 1 wherein the second roller is mounted on a sub-frame which is pivoted to the tool body, and by a leaf spring attached to an external surface of the tool body and extending therefrom into contact with an adjacent external surface of the sub-frame whereby pivotal movement of the sub-frame away from a position corresponding to the datum position of the second roller is resisted by resilient bending of the leaf spring.

9. A tool according to claim 8 wherein the leaf spring is pre-stressed when the sub-frame is in a position corresponding to the datum position of the second roller.

10. A tool according to claim 1 further comprising first and second rotatable shafts carrying the first and second rollers respectively, and the second shaft including a flexible joint to enable the second roller to pivot about the pivot axis.

11. A tool according to claim 10 further comprising motor means mounted on the tool body for rotatably driving the first and second shafts in opposite directions via said driving mechanism.

12. A tool according to claim 1 further comprising a third roller mounted on the tool body for rotation about an axis perpendicular to the first axis for making rotational contact with the strip as the tool moves along the strip on the mount and exerting a force on the outside of the base of the channel.

* * * * *